United States Patent
Feder et al.

(10) Patent No.: US 9,448,771 B2
(45) Date of Patent: Sep. 20, 2016

(54) SYSTEM, COMPUTER PROGRAM PRODUCT, AND METHOD FOR GENERATING A LIGHTWEIGHT SOURCE CODE FOR IMPLEMENTING AN IMAGE PROCESSING PIPELINE

(71) Applicant: Duelight LLC, Sunnyvale, CA (US)

(72) Inventors: Adam Feder, Mountain View, CA (US); Brian Kindle, Sunnyvale, CA (US); William Rivard, Menlo Park, CA (US)

(73) Assignee: Duelight LLC, Sunnyvale, CA (US)

( * ) Notice: Subject to any disclaimer, the term of this patent is extended or adjusted under 35 U.S.C. 154(b) by 0 days.

(21) Appl. No.: 14/517,731

(22) Filed: Oct. 17, 2014

(65) Prior Publication Data

US 2016/0110168 A1    Apr. 21, 2016

(51) Int. Cl.
G06F 9/44 (2006.01)
G06F 9/45 (2006.01)
G06T 1/20 (2006.01)

(52) U.S. Cl.
CPC . *G06F 8/34* (2013.01); *G06F 8/41* (2013.01); *G06T 1/20* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 6,778,948 B1 | 8/2004 | Kanetaka et al. | |
| 7,750,913 B1 * | 7/2010 | Parenteau | G06F 8/30 345/426 |
| 8,797,337 B1 | 8/2014 | Labour et al. | |
| 8,878,963 B2 | 11/2014 | Prabhudesai et al. | |
| 8,988,559 B2 | 3/2015 | Chao et al. | |
| 9,083,935 B2 | 7/2015 | Demandolx et al. | |
| 9,218,662 B1 | 12/2015 | Feder et al. | |
| 2001/0009437 A1 | 7/2001 | Klein et al. | |
| 2001/0033284 A1 | 10/2001 | Chan | |
| 2002/0003545 A1 | 1/2002 | Nakamura | |
| 2002/0060566 A1 * | 5/2002 | Debbins | G06F 8/34 324/307 |
| 2002/0107750 A1 | 8/2002 | Kanevsky et al. | |
| 2003/0206654 A1 | 11/2003 | Teng | |
| 2004/0059783 A1 | 3/2004 | Kazui et al. | |
| 2005/0089212 A1 | 4/2005 | Mashitani et al. | |
| 2006/0008171 A1 | 1/2006 | Petschnigg et al. | |
| 2006/0133375 A1 | 6/2006 | Napierala | |
| 2006/0225034 A1 * | 10/2006 | Peck | G06F 8/34 717/106 |
| 2006/0262363 A1 | 11/2006 | Henley | |
| 2007/0025720 A1 | 2/2007 | Raskar et al. | |
| 2007/0070364 A1 | 3/2007 | Henley | |
| 2007/0101251 A1 | 5/2007 | Lee et al. | |

(Continued)

OTHER PUBLICATIONS

Kindle, B. et al., U.S. Appl. No. 14/547,074, filed Nov. 18, 2014.

(Continued)

*Primary Examiner* — Daxin Wu
(74) *Attorney, Agent, or Firm* — Zilka-Kotab, PC

(57) ABSTRACT

A system, method, and computer program product for generating a lightweight source code for implementing an image processing pipeline is disclosed. The method comprises receiving a specification for an image processing pipeline based on configuration settings associated with a user interface of a viewer application, generating a graphics language (GL) representation of the image processing pipeline based on the specification, and code for causing the GL representation to be compiled via a compile service to generate a binary executable instantiation of the image processing pipeline for execution on one or more graphics processing unit (GPU) cores.

20 Claims, 12 Drawing Sheets

(56) References Cited

U.S. PATENT DOCUMENTS

| | | |
|---|---|---|
| 2007/0146538 A1 | 6/2007 | Kakinuma et al. |
| 2007/0165960 A1 | 7/2007 | Yamada |
| 2007/0260979 A1 | 11/2007 | Hertzfeld et al. |
| 2008/0225057 A1 | 9/2008 | Hertzfeld et al. |
| 2008/0275881 A1 | 11/2008 | Conn et al. |
| 2009/0085919 A1* | 4/2009 | Chen .................. G06T 15/005 345/520 |
| 2010/0013842 A1 | 1/2010 | Green et al. |
| 2010/0118038 A1 | 5/2010 | Labour et al. |
| 2010/0299630 A1 | 11/2010 | McCutchen et al. |
| 2010/0329564 A1* | 12/2010 | Hervas .................. G06T 1/20 382/190 |
| 2011/0145694 A1 | 6/2011 | Graves et al. |
| 2011/0205395 A1 | 8/2011 | Levy |
| 2012/0066355 A1 | 3/2012 | Tiwari et al. |
| 2013/0021358 A1* | 1/2013 | Nordlund .................. G06T 1/20 345/581 |
| 2013/0141456 A1 | 6/2013 | Sokolov et al. |
| 2013/0179308 A1 | 7/2013 | Agustin et al. |
| 2013/0235069 A1 | 9/2013 | Ubillos et al. |
| 2013/0262258 A1 | 10/2013 | Jennings |
| 2013/0342739 A1* | 12/2013 | Yanowitz ............... H04N 5/367 348/246 |
| 2014/0043628 A1 | 2/2014 | Kishino et al. |
| 2014/0098118 A1 | 4/2014 | Liu et al. |
| 2014/0111657 A1 | 4/2014 | Weatherford et al. |
| 2014/0129966 A1 | 5/2014 | Kolesnikov et al. |
| 2014/0140630 A1 | 5/2014 | Hwang et al. |
| 2014/0176759 A1 | 6/2014 | Goto |
| 2014/0210847 A1 | 7/2014 | Knibbeler et al. |
| 2014/0279181 A1 | 9/2014 | Wills |
| 2014/0283113 A1 | 9/2014 | Hanna |
| 2014/0289360 A1 | 9/2014 | Mahkovec et al. |
| 2014/0298323 A1 | 10/2014 | Stolberg et al. |
| 2014/0351687 A1 | 11/2014 | Hall |
| 2015/0016735 A1 | 1/2015 | Kikuchi |
| 2015/0063694 A1 | 3/2015 | Shroff et al. |
| 2015/0092077 A1 | 4/2015 | Feder et al. |
| 2015/0093044 A1 | 4/2015 | Feder et al. |
| 2015/0178977 A1 | 6/2015 | Kontkanen |
| 2015/0195330 A1 | 7/2015 | Lee |
| 2015/0373414 A1 | 12/2015 | Kinoshita |
| 2016/0092472 A1 | 3/2016 | Feder et al. |

OTHER PUBLICATIONS

Non-Final Office Action from U.S. Appl. No. 14/503,224, dated Sep. 2, 2015.
Feder, A. et. al., U.S. Appl. No. 14/535,285, filed Nov. 6, 2014.
Non-Final Office Action from U.S. Appl. No. 14/535,285, dated Feb. 3, 2015.
Nlotice of Allowance from U.S. Appl. No. 14/535,285, dated Jul. 31, 2015.
Restriction Requirement from U.S. Appl. No. 14/503,210, dated Oct. 16, 2015.
Notice of Allowance from U.S. Appl. No. 14/535,285, dated Oct. 15, 2015.
Feder, A., et. al., U.S. Appl. No. 14/843,896, filed Sep. 2, 2015.
Non-Final Office Action from U.S. Appl. No. 14/843,896, dated Jan. 14, 2016.
Non-Final Office Action from U.S. Appl. No. 14/503,210, dated Jan. 12, 2016.
Non-Final Office Action from U.S. Appl. No. 14/547,074, dated Feb. 26, 2016.
Notice of Allowance from U.S. Appl. No. 14/503,224, dated Feb. 3, 2016.

* cited by examiner

SYSTEM, COMPUTER PROGRAM PRODUCT, AND METHOD FOR GENERATING A LIGHTWEIGHT SOURCE CODE FOR IMPLEMENTING AN IMAGE PROCESSING PIPELINE

FIELD OF THE INVENTION

The present invention relates generally to digital photographic systems, and more specifically to a system, method, and computer program product for generating a lightweight source code for implementing an image processing pipeline.

BACKGROUND

A typical digital camera focuses an optical image of a scene onto an image sensor, which samples the optical image to generate an electronic representation of the scene. The electronic representation is then processed and stored as a digital photograph. Many digital cameras and other hand-held devices such as smart phones implement a software-based image processing pipeline for processing the raw data captured by the image sensor to generate the digital photograph.

As digital cameras and other consumer electronic devices become more complex, certain aspects of the image processing pipeline may become more configurable. Additionally, the availability of more and more filters means that the executable code for the image processing pipeline may grow quite large and complex. At the same time, the processing capacity of chips used in digital cameras and other hand-held devices may be limited.

As such, there is a need for addressing issues associated with the image processing pipeline for digital cameras and other hand-held devices and/or other related issues associated with the prior art.

SUMMARY

A system, method, and computer program product for generating a lightweight source code for implementing an image processing pipeline is disclosed. The method comprises receiving a specification for an image processing pipeline based on configuration settings associated with a user interface of a viewer application, generating a graphics language (GL) representation of the image processing pipeline based on the specification, and code for causing the GL representation to be compiled via a compile service to generate a binary executable instantiation of the image processing pipeline for execution on one or more graphics processing unit (GPU) cores.

DETAILED DESCRIPTION

Figure 1:
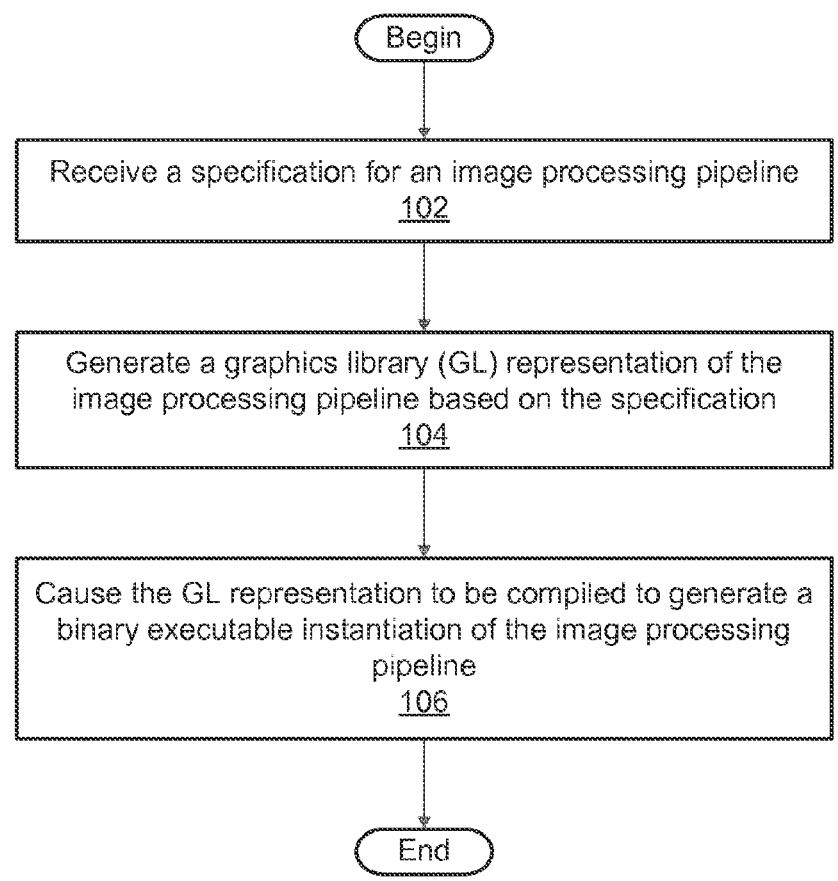
FIG. 1 illustrates a flow chart for a method for generating a lightweight source code for implementing an image processing pipeline, in accordance with one embodiment.

FIG. 1 illustrates a flow chart for a method 100 for generating a lightweight source code for implementing an image processing pipeline, in accordance with one embodiment. As an option, the method 100 may be implemented in the context of the details of any of the Figures. Of course, however, the method 100 may be carried out in any desired environment.

Figure 3A:
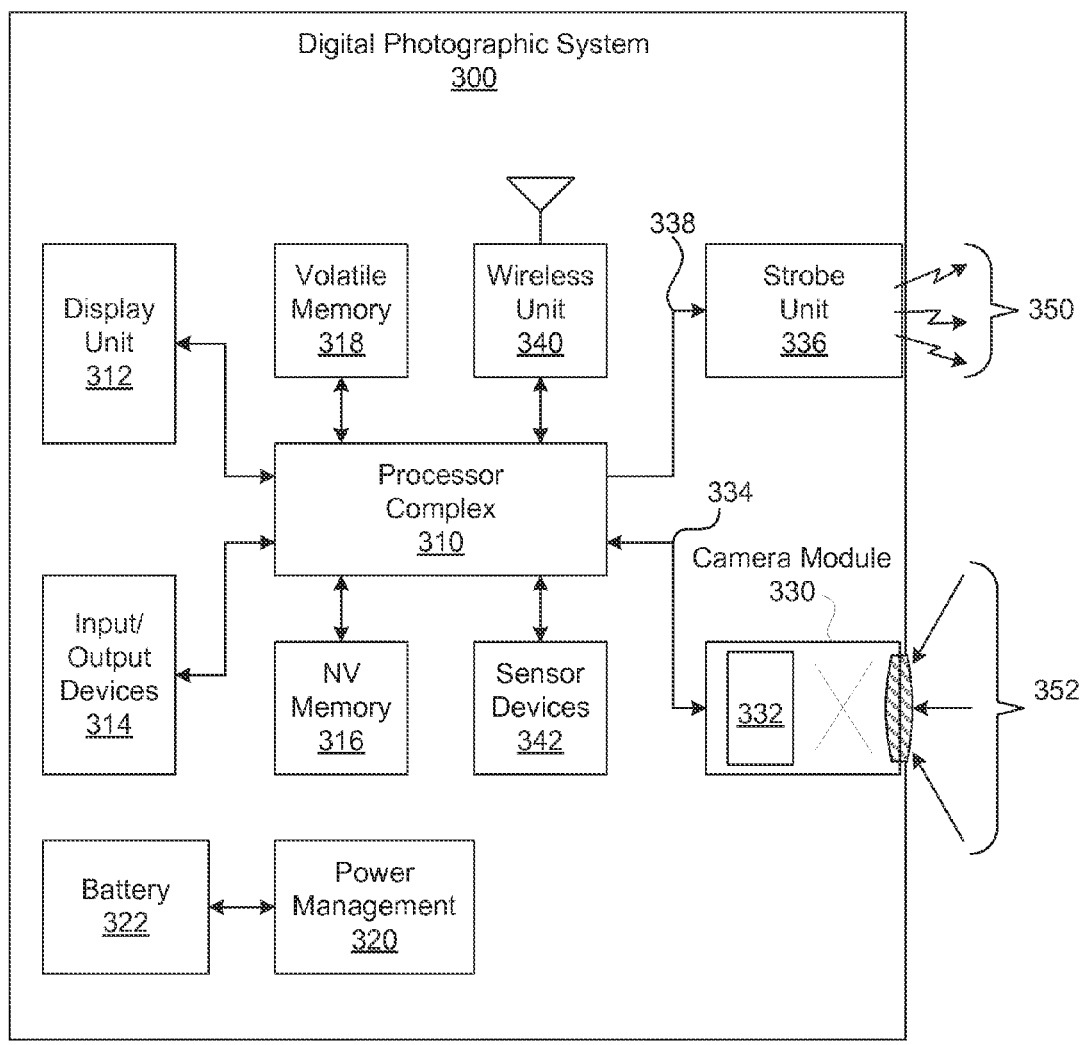
FIG. 3A illustrates a digital photographic system, configured to implement one or more aspects of the present invention.

In one embodiment, a digital photographic system, such as digital photographic system 300 of FIG. 3A, is configured to perform method 100. The digital photographic system 300 may be implemented within a digital camera, such as digital camera 302 of FIG. 3C, or a mobile device, such as mobile device 376 of FIG. 3D.

The method 100 begins at step 102, where a specification for an image processing pipeline is received. In one embodiment, the specification may be based on configuration settings associated with a user interface of a viewer application. Additionally, the viewer application may be a process or processes executed by a host processor. The viewer application may enable a user to view and manipulate images captured by, for example, a digital photographic system that includes the host processor. In such an embodiment, the viewer application may be associated with a user interface displayed on a display device in order to present options for processing images to a user.

In one embodiment, a digital photographic system may generate a digital image (or simply "image") of a photographic scene subjected to either ambient illumination, strobe illumination, or a combination thereof. In such an embodiment, digital photographic systems may include, without limitation, digital cameras and mobile devices such as smart phones that are configured to include a digital camera module and a strobe unit. Further, in one embodiment, a given photographic scene may be a portion of an overall scene sampled by the digital photographic system.

In another embodiment, two or more images are sequentially sampled by the digital photographic system to generate an image set. Each image within the image set may be generated in conjunction with different strobe intensity, different exposure parameters, or a combination thereof. In one embodiment, exposure parameters may include sensor sensitivity ("ISO" parameter), exposure time (shutter speed), aperture size (f-stop), and focus distance. In other embodiments, one or more exposure parameters, such as aperture size, may be constant and not subject to determination. For example, aperture size may be constant based on a given lens design associated with the digital photographic system. At least two of the images comprising the image set may be sampled in conjunction with a strobe unit, such as a light-emitting diode (LED) strobe unit, configured to contribute illumination to the photographic scene.

In one embodiment, exposure parameters are initially determined and held constant for each image in the image set. The exposure parameters may be initially determined based on ambient lighting conditions. If insufficient ambient lighting is available, such as for extremely dark scenes, then exposure parameters may be determined based on mid-range strobe intensity. For example, mid-range strobe intensity may be selected as fifty-percent of maximum strobe intensity for the strobe unit.

The strobe unit may be configured to modulate strobe intensity to provide a range of illumination contribution among the images within the image set. For example, in one embodiment, the image set may comprise ten images, each with monotonically increasing illumination from the strobe unit. The first often images within the image set may be relatively under-exposed with respect to strobe illumination, while the tenth image may be over-exposed with respect to strobe illumination. However, one or more images between the first image and the tenth image will likely be appropriately-exposed with respect to strobe illumination. An image with appropriate illumination may be selected automatically or manually selected by a user. The image with appropriate illumination may then be a resulting image for the photographic scene.

In one embodiment, the digital photographic system may include a viewer application. The viewer application may reside in a memory of the digital photographic system and be associated with a user interface presented on a display of the digital photographic system. In another embodiment, the user interface may include various menus, settings, and user interface elements that enable a user to modify one or more images stored in the memory of the digital photographic system. For example, in one specific embodiment, the user interface may include a slider that enables a user to manually select an image within the image set as the resulting image. The user interface may also include menus that enable a user to select filters to include in an image processing pipeline, checkboxes for selecting particular options associated with the image processing pipeline, and textboxes or drop-down menus for selecting values associated with the image processing pipeline, such as a size of a filter to apply, a threshold value to use with a filter and so forth.

Still yet, in one embodiment, the user may select various options for processing an image or images. By selecting or deselecting certain user interface elements, or by providing values or changing the state of certain user interface elements, a user may configure the manner by which the images are processed by an image processing pipeline. The various configuration changes made by the user may be reflected in the specification by the viewer application. For example, in one embodiment, the user interface may be configured to store a data structure that includes the current state of each of the user interface elements in the user interface. The specification may be generated from this data structure. In another embodiment, an application or process may query the user interface to determine the current state of each of the user interface elements and generate the specification based on the current state of the various user interface elements.

In the context of the present description, configuration settings may refer to the combined state of one or more user interface elements in the user interface used to configure the image processing pipeline. For example, a user may select which filters to apply to a given image or images, and in what order, using the user interface such that a resulting image is displayed by the viewer application by processing one or more images via the custom image processing pipeline. In one embodiment, a list of available filters may include, but is not limited to, no filter (e.g., the output is the same as the input), a white balance filter, a noise reducing filter, a smoothing filter or blur filter, an unsharp filter, a color correction filter, and the like.

At step 104, a graphics library (GL) representation of the image processing pipeline is generated based on the specification. In one embodiment, a code generator module may create the GL representation by stitching together code segments associated with each of the filters included in the image processing pipeline as defined in the specification. In one embodiment, the GL representation may be an object or data structure that represents a plain text string of source code configured according to an OpenGL™ language specification, and may include calls to an OpenGL application programming interface (API). For example, in one embodiment, the GL representation may represent a shader program, such as a fragment shader, comprising a combination of one or more filters applied to the pixels of an image, where the shader program includes one or more OpenGL functions with corresponding executable mappings. Exemplary executable mappings include source code arithmetic operations mapping to corresponding executable arithmetic instructions or corresponding sequences of instructions, source code variable access operations mapping to executable load/store operations, and the like. In other embodiments, the GL representation may target OpenCL™ CUDA™, or any other technically feasible multi-threaded language.

In one embodiment, the user interface elements included in the user interface may enable a user to specify which filters to include in the image processing pipeline and an order for those filters to be applied to the image(s). Further, a code generator module may receive the specification and generate the GL representation by stitching together code segments associated with each of the elements of the pipeline. The code generator module may also be configured to control the flow of data between nodes in the image processing pipeline by specifying how the output of one node (or filter) is tied to the input of the next node (or filter). In one embodiment, the intermediate data may be consumed immediately by the subsequent node or may be stored temporarily in a buffer, as specified by the code generator module.

In addition, the user interface elements may also specify values or settings for applying those filters, such as by enabling the user to customize threshold values associated with the filters, a window size associated with the filters, and the like. The code generator module may include references to uniform variables in the source code of the GL representation. As defined by the OpenGL standard, a uniform variable is a read-only variable that has the same value for all processed vertices or fragments, but can be changed outside of the shader program via an external application executing on the host processor. In other words, the uniform variable may reference a location in memory that stores a value that can be updated between passes of the image processing pipeline by, for example, the viewer application. By including references to uniform variables in the GL representation and passing certain values to the GL representation in a shared memory, some values specified by the user interface elements can be changed at a later time without explicitly changing the source code included in the GL representation. For example, the user may change the value of a slider UI element associated with a uniform, causing a new resulting image to be generated according to a new uniform value. Similarly, a different texture map may be passed to the binary executable instantiation of the image processing pipeline causing a new resulting image to be generated without changing the binary executable instantiation of the image processing pipeline.

At step 106, the GL representation is compiled via a compile service to generate a binary executable instantiation of the image processing pipeline. In one embodiment, the compile service may be associated with a given hardware for executing the image processing pipeline and may be provided by the manufacturer of the hardware for compiling source code that can be executed by that hardware. For example, the image processing pipeline may be executed on one or more graphics processing unit (GPU) cores. The manufacturer of the GPU may provide a compile service module for compiling source code configured for the GPU as either a stand-alone application or as a function call provided via an API implemented by another application (e.g., as a function call made to a driver for the GPU, etc.). In one embodiment, the binary executable instantiation of the image processing pipeline may be executed by the GPU to process one or more images according to the image processing pipeline.

Additionally, in various embodiments, the GL representation may comprise a source code including one or more GL functions with a corresponding executable mapping. The GL function may comprise an OpenGL function. Additionally, an image set may be received that includes a first image of a photographic scene based on a first set of sampling parameters and a second image of the photographic scene based on a second set of sampling parameters, at least one image in the image set may be processed via the binary executable instantiation of the image processing pipeline, In other embodiments, the first set of sampling parameters may comprise ambient exposure parameters for capturing images illuminated by ambient light, and wherein the second set of sampling parameters comprises exposure parameters for capturing images illuminated by a strobe unit. Additionally, the specification may comprise a data structure that identifies at least one filter included in the image processing pipeline and an order for the at least one filter in the image processing pipeline.

In one embodiment, the viewer application, in response to user input associated with the user interface, may be configured to: modify the specification; generate an updated GL representation of the image processing pipeline based on the modified specification; and cause the updated GL representation to be compiled via the compile service to generate an updated binary executable instantiation of the image processing pipeline for execution on the one or more GPU cores.

In another embodiment, the GL representation may include at least one reference to a uniform variable, and the viewer application, in response to user input associated with the user interface, may assign values to the at least one reference to the uniform variable.

In one embodiment, the image processing pipeline may comprise a plurality of filters applied to at least one image in an image set. Additionally, one or more images in an image set may be captured, and a resulting image may be displayed generated by processing the one or more images via the binary executable instantiation of the image processing pipeline.

Further, in another embodiment, the user interface may include at least one of a pull-down menu, a checkbox, a radio button, and a text box, wherein the at least one of the pull-down menu, the checkbox, the radio button, and the text box may define at least part of the image processing pipeline or may specify values for references to uniform variables included in the GL representation.

Figure 2:
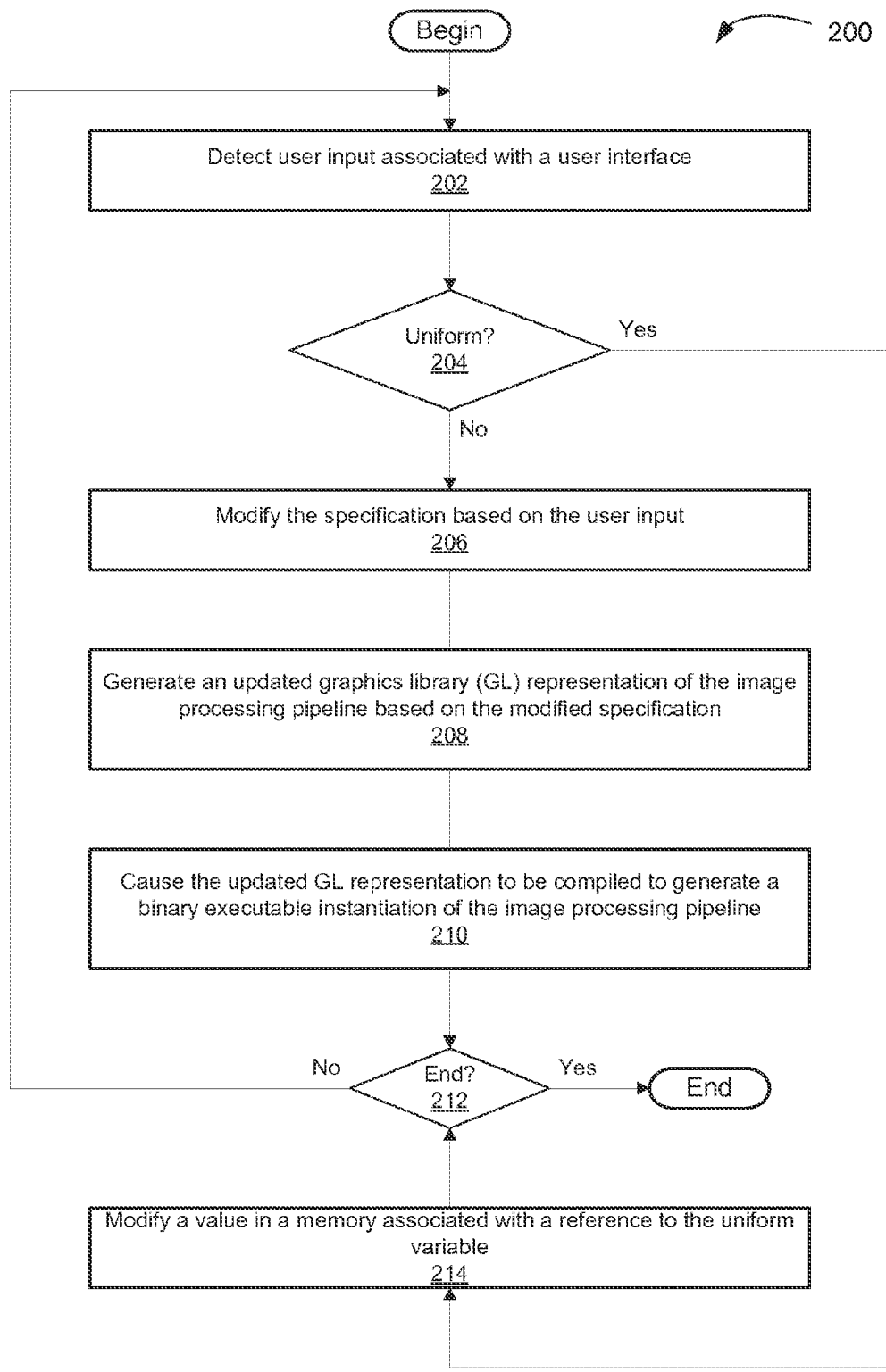
FIG. 2 illustrates a flow chart for a method for updating the GL representation of the image processing pipeline, in accordance with one embodiment.

FIG. 2 illustrates a flow chart for a method 200 for updating the GL representation of the image processing pipeline, in accordance with one embodiment. As an option, the method 200 may be implemented in the context of the details of any of the Figures. Of course, however, the method 200 may be carried out in any desired environment. Further, the aforementioned definitions may equally apply to the description below.

In one embodiment, a digital photographic system, such as digital photographic system 300 of FIG. 3A, is configured to perform method 200. The digital photographic system 300 may be implemented within a digital camera, such as digital camera 302 of FIG. 3C, or a mobile device, such as mobile device 376 of FIG. 3D.

The method 200 begins at step 202, where user input associated with a user interface is detected. In one embodiment, method 100 is performed to generate a lightweight source code for the image processing pipeline and then that source code is compiled to generate a shader program for execution on specialized hardware such as one or more GPU cores. One or more images are then processed by the image processing pipeline. However, when a user makes changes to the configuration settings for the image processing pipeline, the binary executable instantiation of the image processing pipeline may need to be updated. For example, in one embodiment, a user may change the number of filters included in the image processing pipeline or may change a particular setting associated with one of the filters. Such changes to the configuration settings made by the user using one or more user interface elements should be reflected in the binary executable instantiation of the image processing pipeline.

At step 204, the viewer application determines whether the updated configuration setting is associated with a uniform variable. In one embodiment, some configuration settings may specify which filters are included in the image processing pipeline and in what order while other configuration settings may simply specify certain values or settings associated with those filters. These values or settings may be passed to the filter included in the binary executable instantiation of the image processing pipeline via references to uniform variables in the source code. If the configuration setting modified by the user is associated with a uniform variable in the GL representation, then the GL representation does not need to be modified and recompiled. Instead, at step 214, the viewer application may simply modify a value in a memory associated with a reference to the uniform variable to adjust the image processing pipeline for processing subsequent images. In one embodiment, a change in any uniform variable triggers execution of the binary executable instantiation of the image processing pipeline to generate a new resulting image but no change is made to the binary executable. After step 214, the method 200 proceeds to step 212, discussed below.

Returning to step 204, if the configuration setting modified by the user is not associated with a uniform variable, then, at step 206, the viewer application may modify the specification based on the user input. Such user input may, for example, specify a different number and/or order of the filters to be applied to the images by the image processing pipeline. Such modifications to the configuration settings may not simply be effected by changing the value of a uniform variable. Instead, the specification may be modified to define the configuration of the image processing pipeline based on the new configuration settings selected by the user, which may require an updated GL representation of the image processing pipeline. In certain embodiments, code that executes outside the image processing pipeline to manage the image processing pipeline may be configured to adapt accordingly to changes in the specification.

At step 208, an updated GL representation of the image processing pipeline is generated based on the modified specification. In one embodiment, a code generator module may stitch together various code segments for the one or more filters included in the image processing pipeline and control the flow of data between nodes in the image processing pipeline. At step 210, the GL representation is compiled via a compile service to generate a binary executable instantiation of the image processing pipeline. In one embodiment, the binary executable may be transmitted to the GPU and used to process one or more images according to the updated image processing pipeline. At step 212, either the method 200 is terminated or the method 200 returns to step 202 to detect another user input associated with the user interface.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described. While techniques and method disclosed herein are described with respect to altering uniform variables without regenerating the image processing pipeline, texture maps and any other data that does not alter the structure of the image processing pipeline may also be changed without requiring the image processing pipeline or binary executable instantiation of the image processing pipeline to be regenerated. Such changes may or may not trigger computing a new resulting image.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
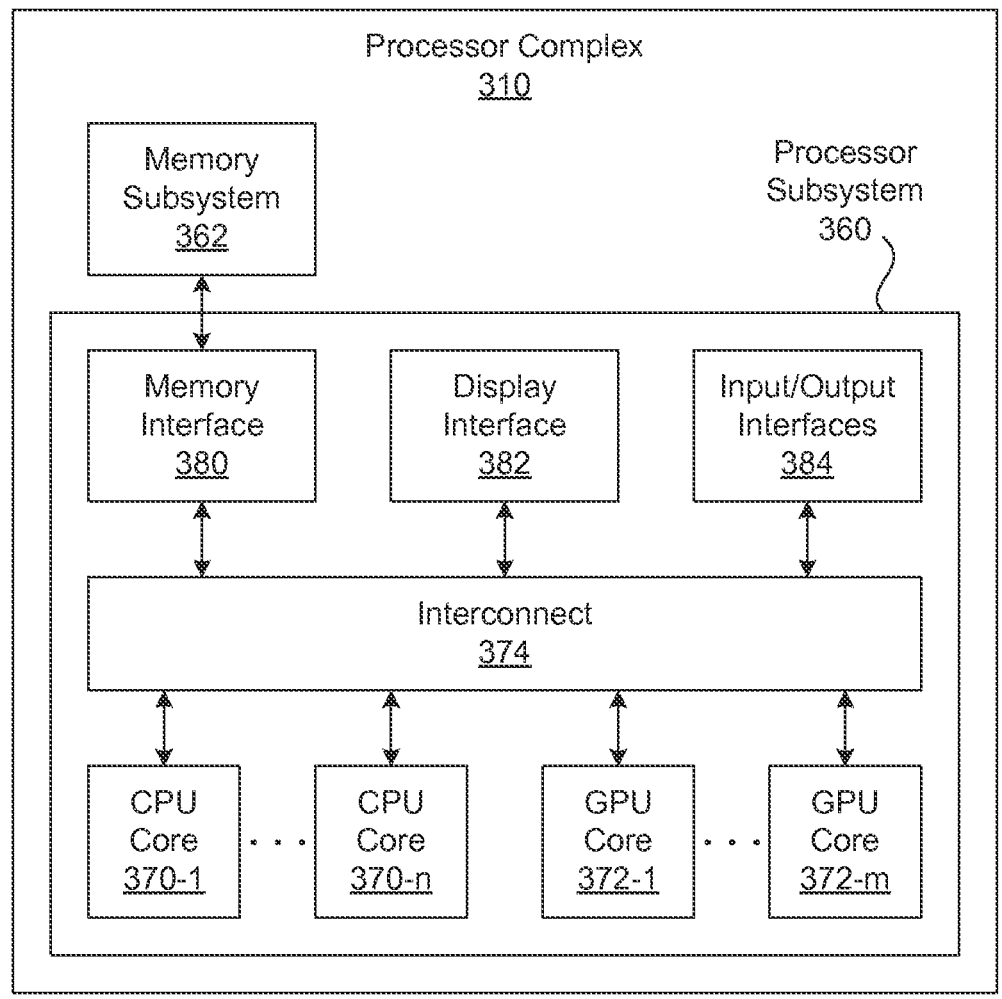
FIG. 3B illustrates a processor complex within the digital photographic system, in accordance with one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene, the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
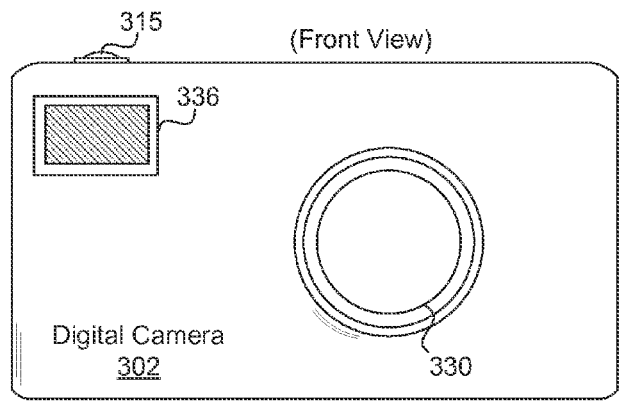
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
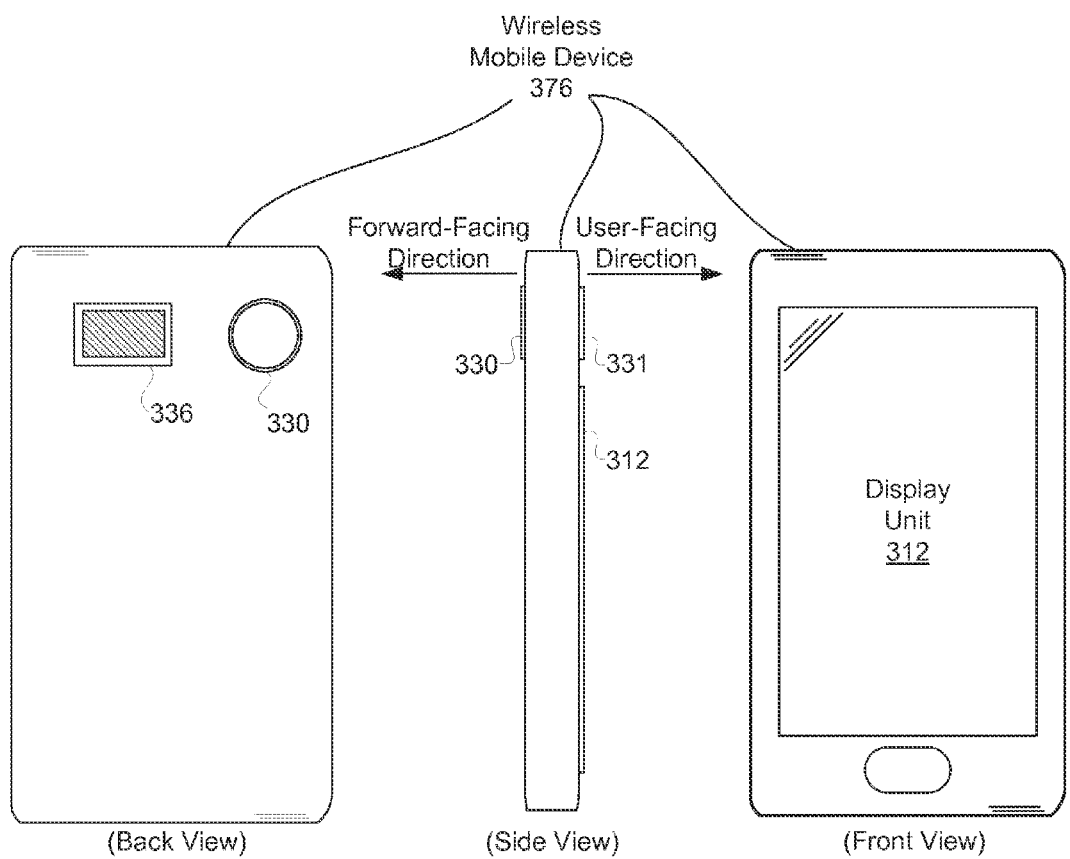
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
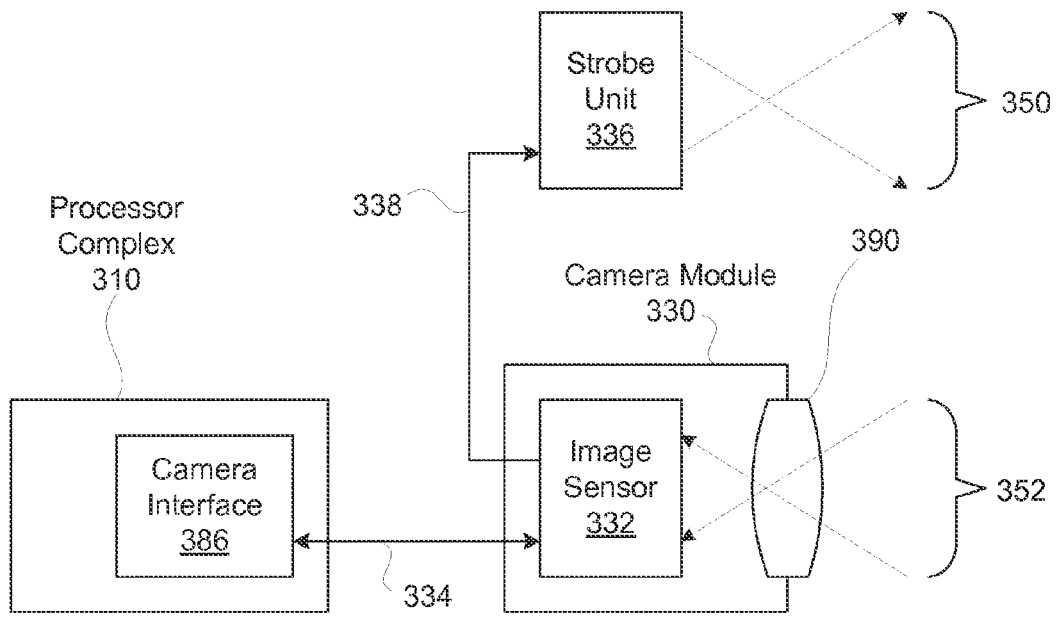
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
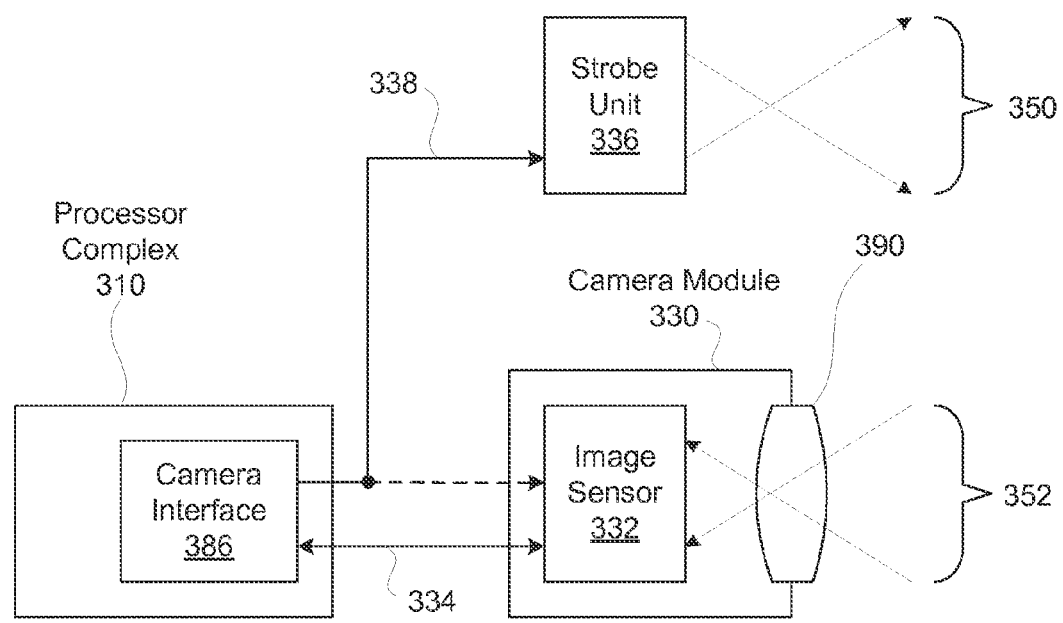
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
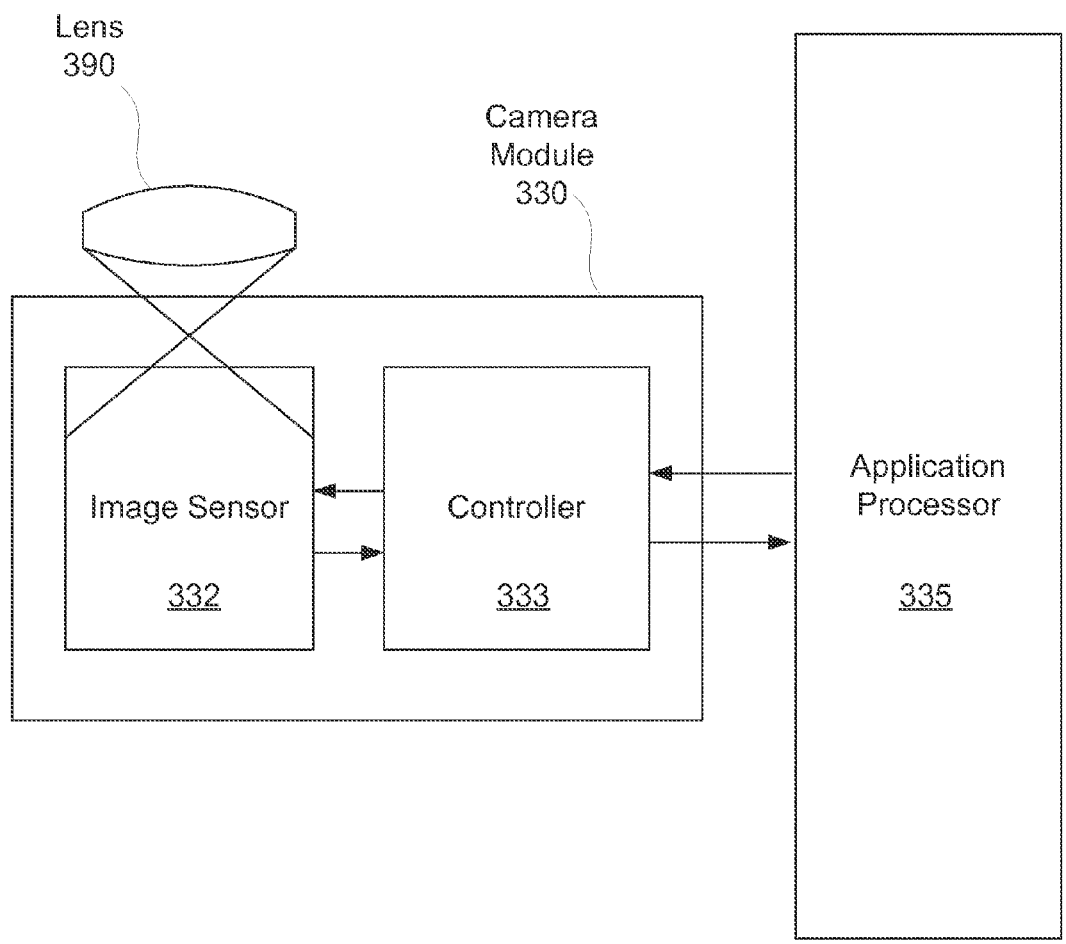
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
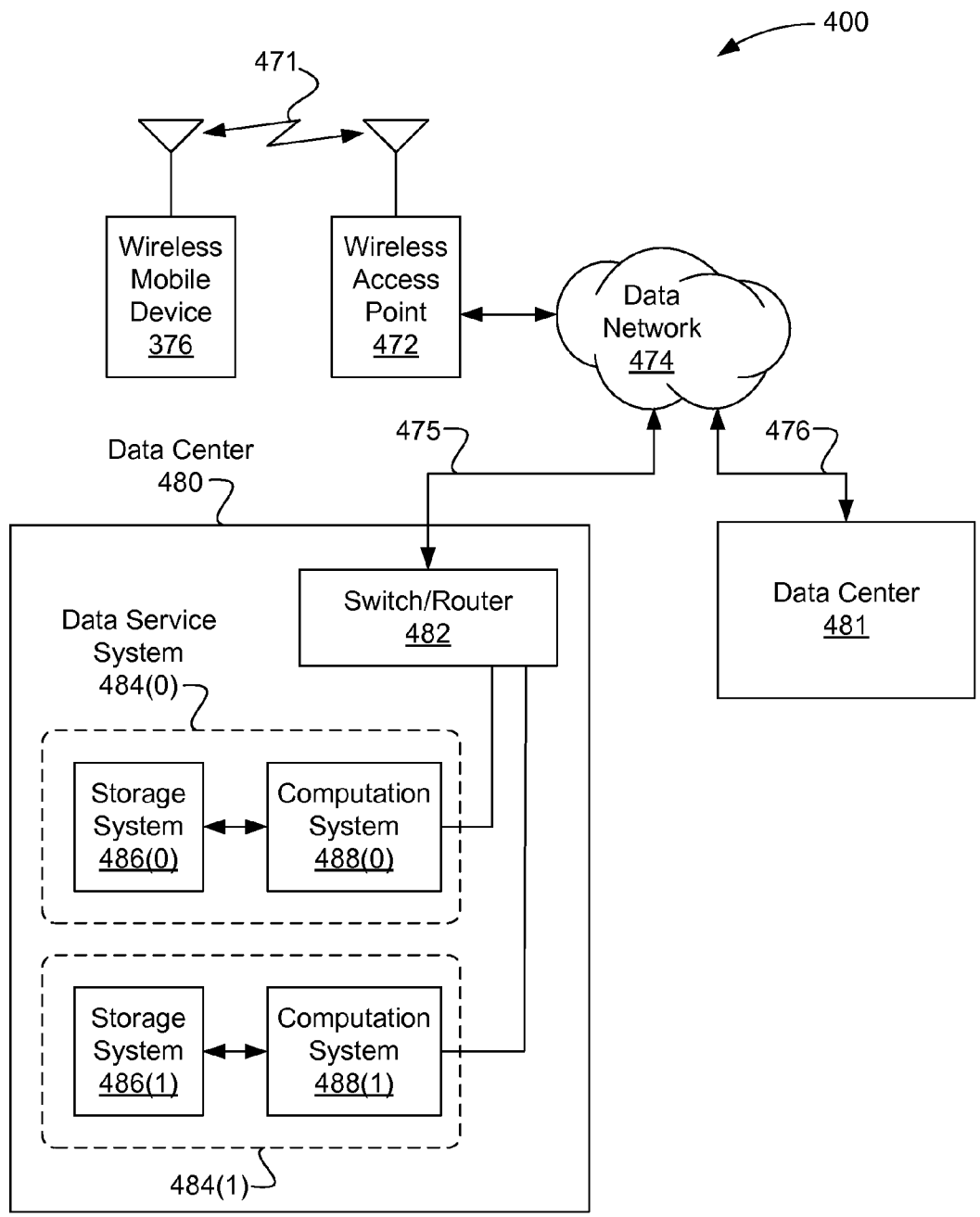
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
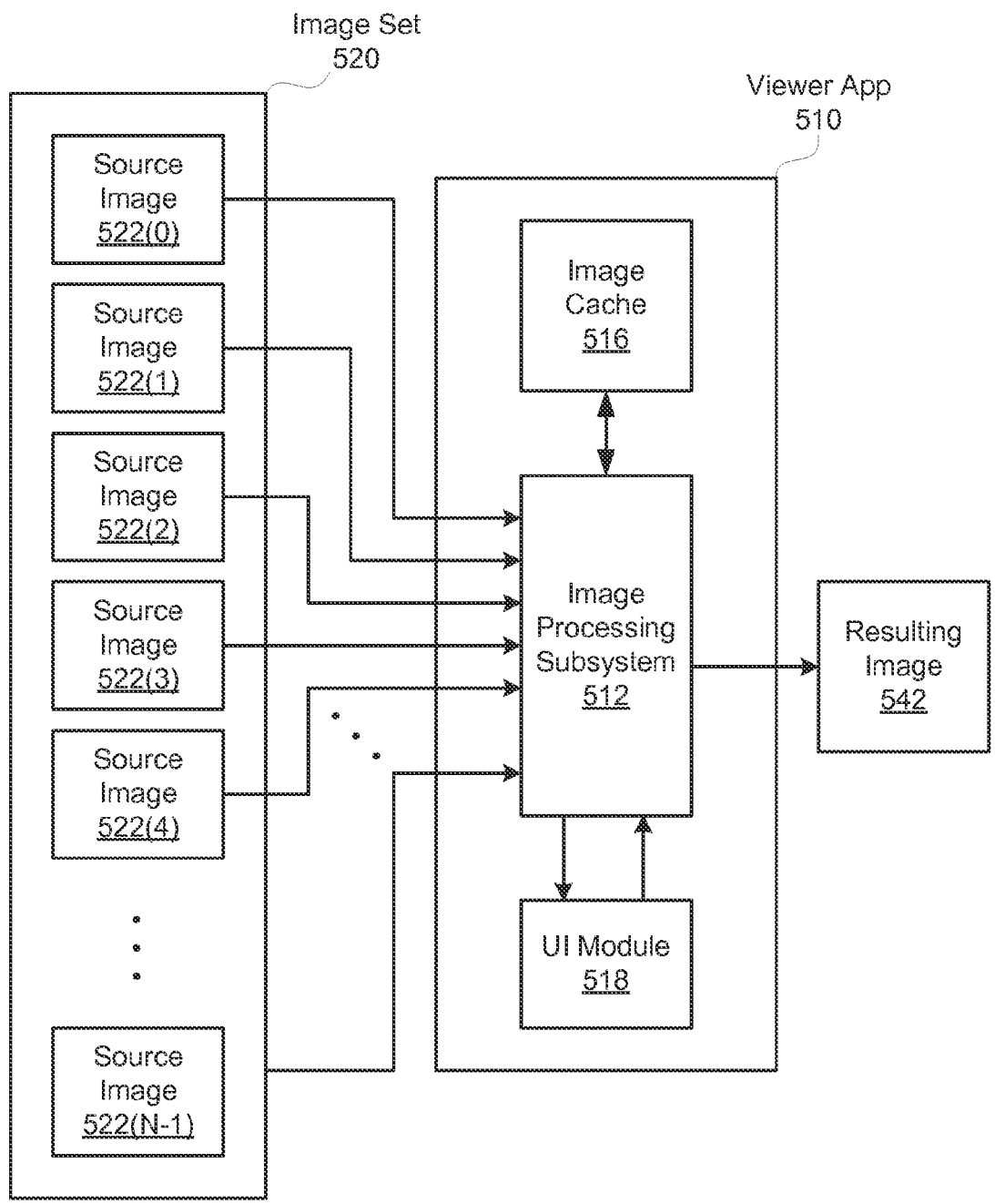
FIG. 5A illustrates a viewer application configured to generate a resulting image based an image set, in accordance with one embodiment.

FIG. 5A illustrates a viewer application 510 configured to generate a resulting image 542 based an image set 520, in accordance with one embodiment. As an option, the viewer application 510 may be implemented in the context of the details of any of the Figures. Of course, however, the viewer application 510 may be carried out in any desired environment. Further, the aforementioned definitions may equally apply to the description below.

The image set 520 includes two or more source images 522, which may be generated by capturing images with the digital photographic system 300 using different exposure parameters.

In one embodiment, the resulting image 542 represents a source image 522 that is selected from the image set 520. The source image 522 may be selected according to any technically feasible technique. For example, in one embodiment, a given source image 522 may be selected automatically based on based on exposure quality. In an alternative embodiment, a given source image 522 may be selected manually through a UI control 530, discussed in greater detail below in FIG. 5B. The UI control 530 generates a selection parameter that indicates the manual selection of a particular source image 522 in the image set 520. An image processing subsystem 512 is configured to generate the resulting image 542 by processing the selected source image (s) 522 via an image processing pipeline. In certain embodiments, the image processing subsystem 512 automatically selects a source image 522 and transmits a corresponding recommended setting to the UI control 530. The recommended setting indicates, through the position of a control knob 534 of the UI control 530, which source image 522 was automatically selected. In one embodiment, a user may keep the recommended setting or select a different source image 522 to use for generating the resulting image 542 using the UI control 530.

In an alternative embodiment, the viewer application 510 may be configured to combine two or more source images 522 to generate a resulting image 542. Further, the two or more source images 522 may be mutually aligned by the image processing subsystem 512 prior to being combined.

The relative position of the control knob 534 between any two discrete positions 536 of UI control 530 may specify a weight assigned to each of two source images 522. The weight may be used to perform a transparency/opacity blend (known as an alpha blend) between the two source images 522.

In certain implementations, viewer application 510 may include an image cache 516, configured to include a set of cached images corresponding to the source images 522. The image cache 516 may provide images that may be used to readily and efficiently generate or display resulting image 542 in response to real-time changes to the user interface. In one embodiment, the cached images may be the result of processing one or more of the source images 522 according to a particular image processing pipeline associated with the current configuration settings of the user interface. That way, when a user adjusts one of the UI elements, such as UI control 530, between two particular discrete positions 536 of the UI control, the viewer application can retrieve the cached images from the image cache 516 rather than processing the source images 522 via the image processing pipeline. In one embodiment, the cached images are rendered to a resolution substantially identical to the screen resolution of display unit 312. Caching images may advantageously reduce power consumption associated with rendering a given source image 522 for display.

The viewer application also includes a UI software module 518. In one embodiment, the UI software module 518 may be configured to render an application window for display on a display device. The application window may include a number of UI elements, described in more detail below in FIG. 5B. In addition, the UI software module 518 may be configured to detect user input with respect to the user interface, such as when a user modifies one of the configuration settings for a particular UI element in the user interface.

In one embodiment, when the UI software module 518 detects that user input has modified one of the configuration changes, the UI software module 518 may update the specification accordingly. In another embodiment, the specification is an object or data structure stored in a memory that represents the current configuration settings for the image processing pipeline.

Figure 5B:
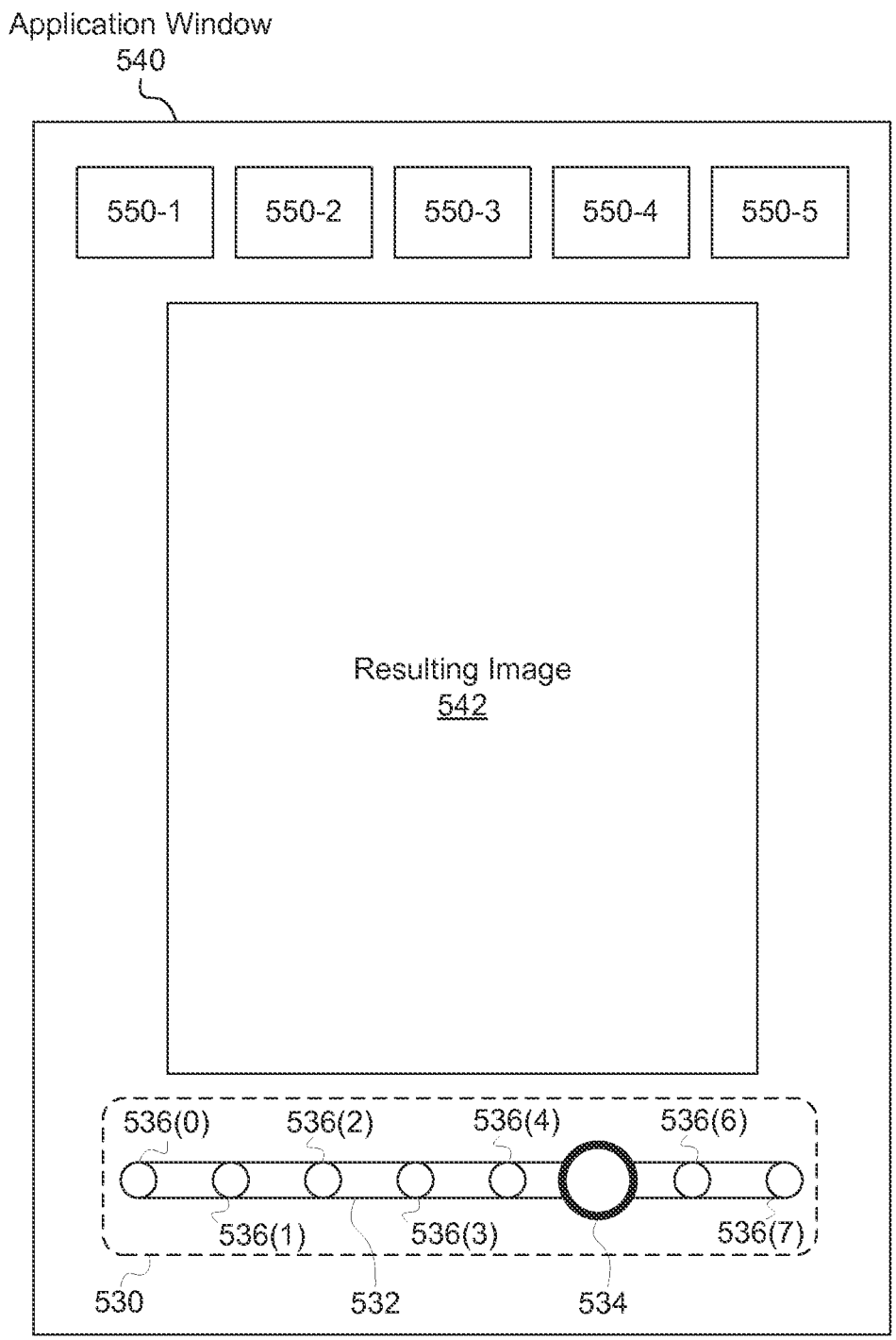
FIG. 5B illustrates an exemplary user interface associated with the viewer application of FIG. 5A, in accordance with one embodiment.

FIG. 5B illustrates an exemplary user interface associated with the viewer application 510 of FIG. 5A, in accordance with one embodiment. As an option, the user interface of FIG. 5B may be implemented in the context of the details of any of the Figures. Of course, however, the user interface of FIG. 5B may be carried out in any desired environment. Further, the aforementioned definitions may equally apply to the description below.

As shown in FIG. 5B, the UI software module 518 generates an application window 540 for presentation on a display device, such as display unit 312 of the digital photographic system 300. The application window 540 may include graphical representations of a resulting image 542, a UI control 530, and one or more additional UI elements 550. The application window 540 may comprise a plurality of pixel information stored in, e.g., a frame buffer in a memory and scanned out to the display device as a video signal. As discussed above, the resulting image 542 may be a combination of one or more images from the image stack as processed by the image processing pipeline. The resulting image 542 may be generated based on the configuration settings for the UI control 530 and/or the UI elements 550.

In one embodiment, the UI control 530 may comprise a linear slider control with a control knob 534 configured to slide along a slide path 532. A user may position the control knob 534 by performing a slide gesture. For example, in one embodiment, the slide gesture may include touching the control knob 534 in a current position, and sliding the control knob 534 to a new position. Alternatively, in another embodiment, the user may touch along the slide path 532 to move the control knob 534 to a new position defined by a location of the touch.

In one embodiment, positioning the control knob 534 into a discrete position 536 along the slide path 532 may cause a corresponding source image 522 to be processed by the image processing pipeline to generate the resulting image 542. For example, in one embodiment, a user may move control knob 534 into discrete position 536(3), to indicate that source image 522(3) is selected. The UI software module 518 may indicate to the image processing subsystem 512 that one or more configuration settings have been modified and update the specification, if necessary. In one embodiment, the control knob 534 may be configured to snap to a closest discrete position 536 when released by a user withdrawing their finger.

In an alternative embodiment, the control knob 534 may be positioned between two discrete positions 536 to indicate that resulting image 542 should be generated based on two source images 522 corresponding to the two discrete positions 536. For example, if the control knob 534 is positioned between discrete position 536(3) and discrete position 536(4), then the image processing subsystem 512 generates resulting image 542 from source images 522(3) and 522(4). In one embodiment, the image processing subsystem 512 generates resulting image 542 by aligning source images 522(3) and 522(4), and performing an alpha-blend between the aligned images according to the position of the control knob 534. For example, if the control knob 534 is positioned to be one quarter of the distance from discrete position 536(3) to discrete position 536(4) along slide path 532, then an aligned image corresponding to source image 522(4) may be blended with twenty-five percent opacity over a fully opaque aligned image corresponding to source image 522(3).

In one embodiment, UI control 530 may be configured to include a discrete position 536 for each source image 522 within a given image set 520 being viewed. Each image set 520 stored within the digital photographic system 300 of FIG. 3A may include a different number of source images 522, and UI control 530 may be configured to establish discrete positions 536 to correspond to the source images 522 for a given image set 520.

In addition to UI control 530, the application window 540 may include one or more UI elements 550 that enable a user of the viewer application 510 to adjust configuration settings associated with the image processing pipeline. Although only shown conceptually in FIG. 5B, the UI elements 550 may take any form such as drop-down menus, text boxes, check boxes, combo boxes, radio buttons, icons, and the like. In addition to UI elements displayed on the application window 540, additional UI elements may be displayed within dialog boxes that are displayed based on user input, such as by selecting one of UI elements 550.

In one embodiment, the UI elements 550 may be associated with configuration settings that define the image processing pipeline. For example, one UI element 550 may comprise a drop-down menu that lists a number of filters to include in the image processing pipeline. A user may select each filter that they want to include in the image processing pipeline by selecting the items in the drop-down menu. As a particular filter is selected, other UI elements 550 may be used to specify various configuration settings associated with that filter or to specify other filters to be included in a filter pipeline. For example, in one embodiment, one UI element may be a checkbox for specifying whether the filter should be included in the image processing pipeline. Another UI element 550 may be a textbox or drop-down menu for selecting a particular value used when applying that filter, such as a color value, a window size, etc. Another UI element 550 may be a series of radio buttons for selecting one of a pre-configured set of values associated with the filter. It will be appreciated that the UI elements 550 described herein are only for illustrative purposes and any UI elements capable of receiving user input to specify a value or configuration setting associated with the image processing pipeline is within the scope of the embodiments.

As discussed above, in response to user input that modifies the setting of one of the UI elements 550, the UI software module 518 may be configured to update the specification based on the state of the UI element 550. In one embodiment, the specification is only updated based on a subset of UI elements 550 that are related to a change of the image processing pipeline not associated with a reference to a uniform variable. In such an embodiment, a modification to the UI element may be reflected by changing a value in the memory corresponding to the reference to the uniform variable. In contrast, other UI elements 550 may be related to a change of the image processing pipeline that is not associated with a reference to a uniform variable. In one embodiment, such changes may be fundamental to the image processing pipeline, such as the addition or removal of a filter, a change in the filter ordering, and so forth, such that the UI software module 518 may update the specification and notify the image processing subsystem 512 that the image processing pipeline needs to be updated.

Figure 6A:
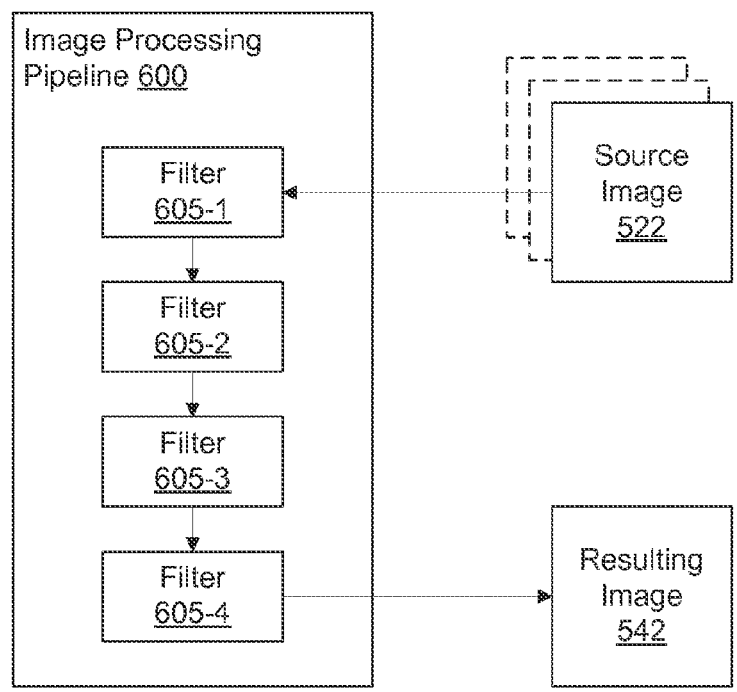
FIG. 6A illustrates an image processing pipeline, in accordance with one embodiment.

FIG. 6A illustrates an image processing pipeline 600, in accordance with one embodiment. As an option, the image processing pipeline 600 may be implemented in the context of the details of any of the Figures. Of course, however, the image processing pipeline 600 may be carried out in any desired environment. Further, the aforementioned definitions may equally apply to the description below.

As shown in FIG. 6A, the image processing pipeline 600 receives one or more source images 522 and generates a resulting image 542. At least one source image 522 is processed by a filter (e.g., 605-1, etc.) and the resulting filtered image is forwarded to the next filter (e.g., 605-2, etc.). As image data makes its way down the pipeline, eventually the image data is processed by the last filter in the image processing pipeline, such as filter 605-4, and the resulting image data corresponds to the resulting image 542. In one embodiment, each filter 605 is implemented as a fragment shader, configured to execute as a multi-threaded program where each thread generates one pixel of the resulting image 542. In one embodiment, at least one source image is passed to the image processing pipeline 600 as a texture map.

It will be appreciated that the types of filters 605 implemented in image processing pipelines are numerous. Each manufacturer of a digital camera may implement a different image processing pipeline that is tailored to their specific hardware. Examples of the types of filters 605 implemented in image processing pipelines include, but are not limited to, white balance filters, Debayer filters, gamma correction filters, color correction filters, blur filters, unsharp mask filters, noise reducing filters, chroma subsampling filters, and compression filters. It will be appreciated that any type of image processing filter may be implemented as a node of the image processing pipeline 600.

In many digital cameras on the market today, the image processing pipeline is pre-configured. For example, an image may be captured by the image sensor and sampled in a predefined way to generate raw image data. The raw image data is then demosaiced (i.e., Debayered) to generate a digital image in an RGB color space. A white balance function may be applied. A filter may also be applied (e.g. Gaussian blur, etc.). Gamma correction may be applied. The image may be converted from one color space to another color space. Finally, the image may be subsampled and compressed to be stored in a particular image format. This image processing pipeline may be implemented in hardware, software, or a combination of hardware and software. In other embodiments, the processing pipeline may not be changed (except that certain filters may be bypassed depending on the cameras settings, such as by not applying the white balance filter).

These image processing pipelines are typically limited to a small number of conventional filters used to make the images have a uniform look. In other words, more complex image processing filters are typically not included in the pre-configured image processing pipelines. Instead, users must transfer the digital images to a desktop computer and edit the images using photo-editing software such as Adobe® Photoshop. The ability to implement the large number of filters available in the photo-editing software in a particular image processing pipeline would be impractical and the limitations of the hardware would quickly be reached by trying to implement a pre-configured image processing pipeline with tens or even hundreds of different filters. By contrast, embodiments of the present invention enable greater flexibility by allowing a user to select specific filters from a set of available filters, and an order for performing filter operations using the selected filters. For example, as shown below in FIG. 6B, an image processing pipeline can be configured on-the-fly in order to implement only a subset of filters selected from a large number of available filters selected by a user. As such, a large variety of image processing filters may be made available to a user while not being constrained by the hardware of the device.

Figure 6B:
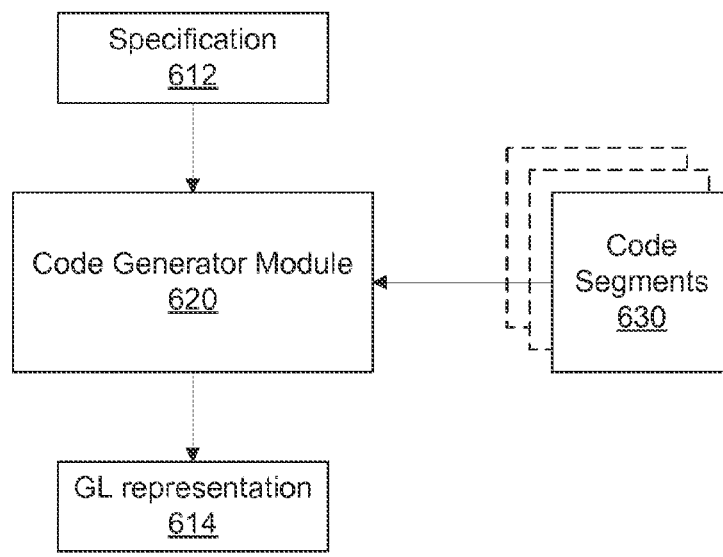
FIG. 6B illustrates the generation of a graphics library (GL) representation of the image processing pipeline of FIG. 6A, in accordance with one embodiment.

FIG. 6B illustrates the generation of a graphics language (GL) representation 614 of the image processing pipeline 600 of FIG. 6A, in accordance with one embodiment. As an option, the generation of the GL representation 614 may be implemented in the context of the details of any of the Figures. Of course, however, the generation of a GL representation 614 may be carried out in any desired environment. Further, the aforementioned definitions may equally apply to the description below.

As used herein, a graphics language refers to any system of software language semantics, API functions, and related functions used to implement graphics operations. In one embodiment, a graphics language may refer to the OpenGL® standard graphics library (e.g. which may define a standard set of functions that comprise an application programming interface, etc.). In one embodiment, specialized graphics hardware, such as the GPU cores 372 of FIG. 3B, may be utilized to implement the functions defined by the GL and API.

In one embodiment, the manufacturer of the graphics hardware may supply a device driver that executes on a host processor, where the device driver may implement the API calls defined in the OpenGL standards, or some other graphics library like Direct3D®. An application program, such as the viewer application 510, may then include calls to the API functions that are linked to the device driver. In one embodiment, when the application makes an API call, the driver is configured to implement the corresponding operation, typically with the use of the specialized graphics hardware.

In another embodiment, GPUs may be specifically designed to process a large amount of data in parallel. This may be particularly useful in image processing applications. Most filters used to process an image can be executed in parallel for each pixel in the image, thereby performing the operation much faster than if each pixel of the image was processed serially. For example, in one embodiment, a blur function will compute a filtered pixel value for each pixel in the image based on a number of pixel values surrounding that particular pixel. These filters may be implemented by creating what is referred to as a shader program, or more specifically, a pixel or fragment shader program.

In the context of the present description, the shader program is defined using source code that includes calls to functions defined in the graphics library. The shader program may be written as a small code segment or group of instructions that will be applied to each pixel in the image being processed. The output of the shader program may be a pixel value (e.g., an rgb vector, an rgba vector, etc.) and may correspond to a particular pixel in the intermediate results or resulting image 542.

It will be appreciated that the filters 605 included in the image processing pipeline may be implemented as shader programs that are executed on one or more GPU cores 372 of the processor complex 310 of FIG. 3B. Therefore, the abstract image processing pipeline 600 of FIG. 6A may be implemented by combining a number of shader programs that implement each of the filters 605 and then controlling the flow of data through the shader programs to generate the resulting image 542.

As shown in FIG. 6B, a code generator module 620 may be implemented within the viewer application 510. The code generator module 620 receives the specification 612 that defines the image processing pipeline 600. As discussed above, the specification 612 may be a data structure that includes the configuration settings associated with the user interface associated with the viewer application 510. The code generator module 620 analyzes the specification to determine an order of filters 605 included in the image processing pipeline 600.

In one embodiment, once the code generator module 620 determines which filters 605 to include in the image processing pipeline 600, the code generator module 620 may fetch one or more code segments 630 corresponding to each of the filters 605. In one embodiment, the code segments 630 may be stored in a non-volatile memory, such as NV memory 316 of the digital photographic system 300. In another embodiment, the code segments 630, as well as metadata associated with the code segments 630, may be stored in a database and fetched in response to a query to the database. The database may be stored in the non-volatile memory of the device, or stored remotely and accessed via a web-service. In one embodiment, if the database is stored remotely, then the code generator module 620 may be configured to fetch code segments 630 the first time they are included in the image processing pipeline 600 and then cache the code segments 630 locally for reuse in later implementations of the image processing pipeline 600. In such an embodiment, this may allow a large number of filters 605 to be made available on the Internet, but only those filters 605 that are used to be stored on the local device.

Each code segment 630 may include a plain text version of a shader program for a particular filter 605. In other words, the code segment 630 for a particular filter 605 may include the source code for the filter, including any graphics library functions needed to implement the filter 605 on the graphics hardware. For example, as shown below, Table 1 illustrates the source code included in a first code segment for a "no filter" operation (i.e., the input pixel is returned as the output pixel), and Table 2 illustrates the source code included in a second code segment for a white balance operation.

TABLE 1

DgStitchletNone_frag.glsl:
highp vec3 com_dueLight_none(highp vec3 rgb) {
    return rgb;
}

TABLE 2

DgStitchletWhiteBalance_frag.glsl:
highp vec3 com_dueLight_whiteBalance(highp vec3 rgb, highp float tilt) {
    precision_highp_float;
    if (tilt == 0.) {
        return rgb;
    }
    // perform white balance op based on tilt
    vec3 processed = vec3(...);
    return mix(rgb, processed, tilt);
}

In one embodiment, the code segments 630 shown above may be stored as objects (e.g., files, etc.) in the non-volatile memory. In addition, the code segments 630 may be associated with metadata that describes the code segments 630, such as a length of the code segment 630, in bytes, the names of the parameters passed to the filter in the code segment 630, whether the code segment is associated with any uniform variables, and so forth. Metadata may include any useful information about the code segment 630 that may be utilized by the code generator module 620 or the viewer application 510.

Again, it will be appreciated that the code segments 630 shown above are for illustrative purposes and other types of code segments 630 are within the scope of the present disclosure. For example, the code segments 630 may include source code for a Debayer operation, an unsharp mask operation, a noise reducing operation, an edge detection operation, a color correction operation, a blur operation, and so forth.

Once the code generator module 620 has fetched the required code segments 630, the code generator module 620 may stitch the code segments 630 together to generate a single GL representation 614 of the image processing pipeline 600. More specifically, the code generator module 620 may create a single, plain text file or text string with source code for instantiating each of the filters 605 included in the image processing pipeline 600 using the graphics hardware. In one embodiment, the code generator module 620 may include each of the fetched code segments 630 in the GL representation 614. The code generator module 620 also may define references to uniform variables such that one or more values included in the configuration settings may be passed to the filters 605 during execution.

In one embodiment, references to uniform variables are included such that certain values specified by the UI elements may be changed without requiring a new GL representation to be generated and compiled. For example, in Table 2 above, the white balance operation takes a parameter called "tilt" that may be changed within the UI to adjust the manner that white balance is performed. The tilt parameter allows for compensation of the color temperature and a green-magenta shift of the light used to illuminate a scene.

Finally, the code generator module 620 includes a function in the GL representation 614 for specifying the processing order for each of the defined filters 605. In one embodiment, the function may take a pixel value as an input parameter, process the pixel value based on a first filter 605, process the resulting pixel value based on a second filter 605, and so forth until the pixel value has been processed by each of the filters 605 included in the image processing pipeline 600. Table 3 illustrates a GL representation of an image processing pipeline having two filters, the no filter operation and the white balance operation shown above in Tables 1 and 2, respectively.

TABLE 3

```
// com_dueLight_none
highp vec3 com_dueLight_none(highp vec3 rgb) {
    return rgb;
}
// com_dueLight_whiteBalance
uniform highp float com_dueLight_whiteBalance_tilt_1;
highp vec3 com_dueLight_whiteBalance(highp vec3 rgb,
highp float tilt) {
    precision_highp_float;
    if (tilt = 0.) {
        return rgb;
    }
    // do white balance op based on tilt
    vec3 processed = vec3(...);
    return mix(rgb, processed, tilt);
}
// stitcherFilter
highp vec3 stitcherFilter(highp vec3 rgb) {
    rgb = com_dueLight_none(rgb);
    rgb = com_dueLight_whiteBalance(rgb,
    com_dueLight_whiteBalance_tilt_1);
    return rgb;
});
```

In one embodiment, the code generator module 620 may instantiate a stitcher object from a stitcher class. In one embodiment, the stitcher class may include code for adding references to filters 605 to the stitcher object and code for generating the GL representation 614 based on the filters 605 associated with the stitcher object. The main body of the code generator module 620 may include a loop for parsing the specification 612, fetching the code segments 630 for the filters 605 identified by the specification 612, querying the metadata associated with the code segments 630 to determine whether any uniform variables are defined for the filters 605, and adding the code segments 630 and unique uniform variable definitions to the GL representation 614. The main body of the code generator module 620 may also include an instruction for adding a main function to the GL representation 614 that instantiates the processing order of each of the filters 605 included in the image processing pipeline 600. Alternatively, the code segments 630 may be instantiated and stitched as in-line code within the GL representation 614. In other embodiments, more than one image processing pipelines may be similarly generated, each configured to perform certain operations that may operate together or independently within the context of an application such as viewer application 510.

Figure 7:
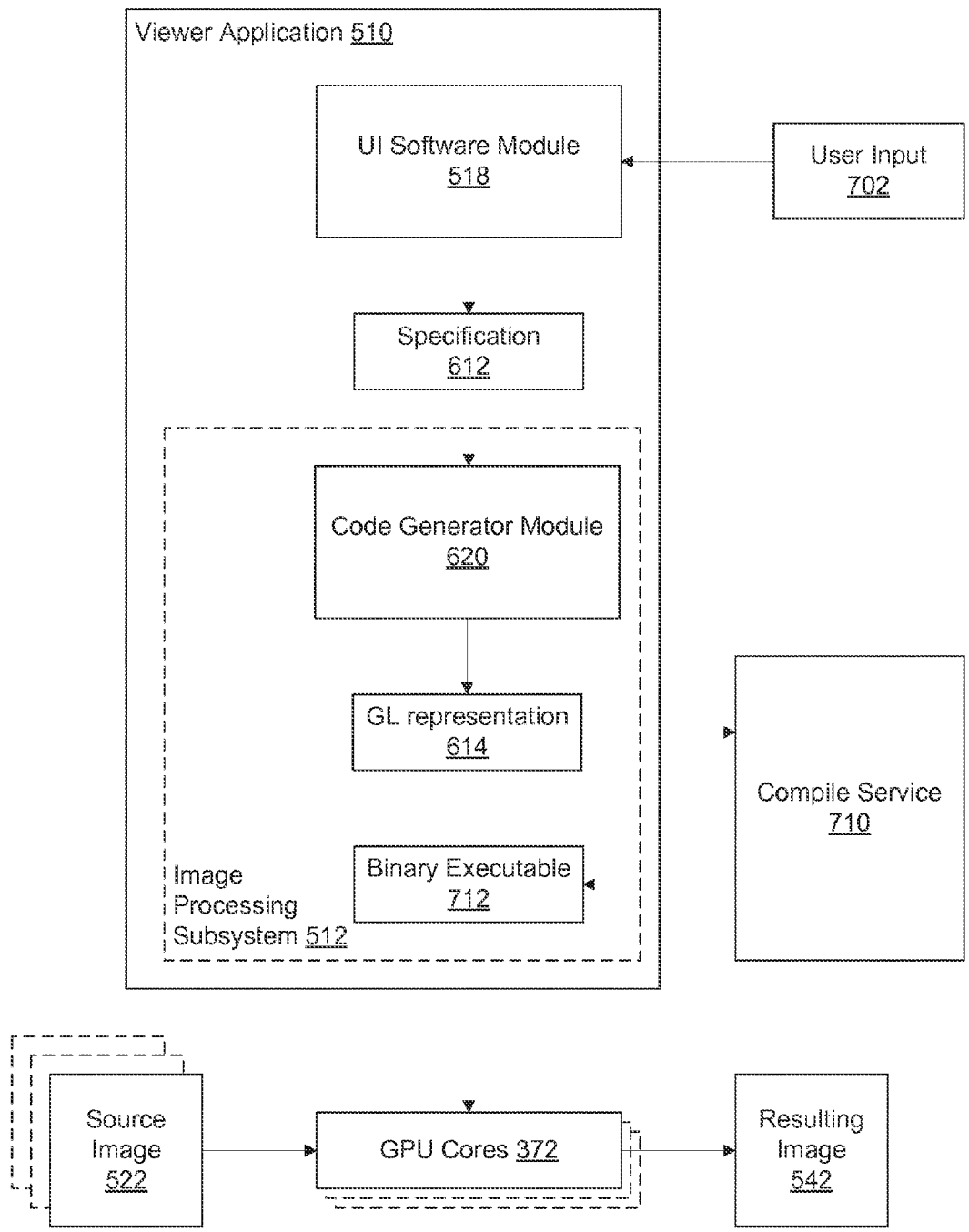
FIG. 7 illustrates the implementation of the image processing pipeline by the viewer application of FIG. 5A, in accordance with one embodiment.

FIG. 7 illustrates the implementation of the image processing pipeline 600 by the viewer application 510 of FIG. 5A, in accordance with one embodiment. As an option, the implementation of the image processing pipeline 600 of FIG. 7 may be implemented in the context of the details of any of the Figures. Of course, however, the implementation of the image processing pipeline 600 of FIG. 7 may be carried out in any desired environment. Further, the aforementioned definitions may equally apply to the description below.

As shown in FIG. 7, the viewer application 510 includes the UI software module 518 and the image processing subsystem 512, which includes the code generator module 620. The UI software module 518 receives user input 702 that changes at least one configuration setting associated with at least one UI element in the user interface of viewer application 510. In response, the UI software module 518 updates the specification 612 to reflect the image processing pipeline 600 defined by the current configuration settings. The code generator module 620 receives the updated specification 612 and generates the GL representation 614 of the image processing pipeline 600. Then, the image processing subsystem 512 transmits the GL representation 614 to a compile service 710 to compile the GL representation 614 and generate a binary executable instantiation 712 of the image processing pipeline 600. The image processing subsystem 512 then loads the binary executable instantiation 712 of the image processing pipeline 600 on the graphics hardware, such as one or more GPU cores 372 of the digital photographic system 300. Then, the image processing subsystem 512 causes one or more images, such as source images 522 to be processed according to the image processing pipeline 600 on the graphics hardware to generate the resulting image 542.

In one embodiment, the compile service 710 may comprise a function included in a device driver for the graphics hardware and may be executed by a host processor. In one embodiment, the compile service may generate the binary executable instantiation 712 of the image processing pipeline 600 in a matter of milliseconds. Consequently, a resulting image 542 may be generated from stored source images 522 in a very small time, allowing new image processing pipelines to be defined and compiled in real-time in response to user input 702 associated with the user interface. Thus, a user may quickly define new image processing pipelines that include different filters to process a given image using a subset of simple UI elements such as menus and checkboxes and the like. These customizable image processing pipelines may be generated and executed in a matter of milliseconds in order to show the user the response of their changes to the resulting image 542.

In one embodiment, the UI software module 518 may monitor the user interface to detect the user input 702. If any modifications are made, the UI software module 518 may determine whether the changes require a new image processing pipeline 600 to be generated. If so, the code generator module 620 creates a modified GL representation 614 that represents the new image processing pipeline 600. The modified GL representation 614 may be compiled by the compile service and loaded into the graphics hardware to re-process the source image(s) 522.

One advantage of the present invention is that a user may specify a customizable image processing pipeline for use on mobile devices that may have scaled down or power-limited hardware. The code for each distinct image processing pipeline is kept lightweight and only includes the code for the included filters. Thus, this code may be easily executed on limited graphics hardware without experiencing undue delays. In conventional systems, the image processing pipeline would typically be implemented with all available filters and a manner to bypass some filters based on configuration settings in the device, or the filters may be modular but require intermediate buffers to store materialized intermediate images. However, because the source code includes the instructions for every available filter, processing images with the pipeline would take a long time and practical limitations required that only a small number of filters would be included in the image processing pipeline. Other filters would need to be manually added later using image editing software. With the system disclosed herein, a user may add a large variety of filters directly into an image processing pipeline of a device such that those filters are immediately applied to the images captured by the device. Furthermore, the device enables real-time modifications to be made to the image processing pipeline so that a user may determine the best possible configuration for their application.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    code for receiving a specification for an image processing pipeline based on configuration settings associated with a user interface of a viewer application, wherein the specification is further based on a current state of the configuration settings or a data structure identifying at least one filter included in the image processing pipeline;
    code for generating a graphics language (GL) representation of the image processing pipeline based on the specification; and
    code for causing the GL representation to be compiled via a compile service to generate a binary executable instantiation of the image processing pipeline for execution on one or more graphics processing unit (GPU) cores.

2. The computer program product of claim 1, wherein the GL representation comprises a source code including one or more GL functions with a corresponding executable mapping.

3. The computer program product of claim 2, wherein the GL function comprises an OpenGL function.

4. The computer program product of claim 1, further comprising:
    code for receiving an image set that includes a first image of a photographic scene based on a first set of sampling parameters and a second image of the photographic scene based on a second set of sampling parameters; and
    code for processing at least one image in the image set via the binary executable instantiation of the image processing pipeline.

5. The computer program product of claim 4, wherein the first set of sampling parameters comprises ambient exposure parameters for capturing images illuminated by ambient light, and wherein the second set of sampling parameters comprises exposure parameters for capturing images illuminated by a strobe unit.

6. The computer program product of claim 1, wherein the specification comprises a data structure that identifies at least one filter included in the image processing pipeline and an order for the at least one filter in the image processing pipeline.

7. The computer program product of claim 1, wherein the viewer application, in response to user input associated with the user interface, is configured to:
    modify the specification;
    generate an updated GL representation of the image processing pipeline based on the modified specification; and
    cause the updated GL representation to be compiled via the compile service to generate an updated binary executable instantiation of the image processing pipeline for execution on the one or more GPU cores.

8. The computer program product of claim 1, wherein the GL representation includes at least one reference to a uniform variable.

9. The computer program product of claim 8, wherein the viewer application, in response to user input associated with the user interface, assigns values to the at least one reference to the uniform variable.

10. The computer program product of claim 1, wherein the image processing pipeline comprises a plurality of filters applied to at least one image in an image set.

11. The computer program product of claim 1, further comprising code for capturing one or more images in an image set.

12. The computer program product of claim 11, further comprising code for displaying a resulting image generated by processing the one or more images via the binary executable instantiation of the image processing pipeline.

13. The computer program product of claim 1, wherein the user interface includes at least one of a pull-down menu, a checkbox, a radio button, and a text box.

14. The computer program product of claim 13, wherein the at least one of the pull-down menu, the checkbox, the radio button, and the text box define at least part of the image processing pipeline or specify values for references to uniform variables included in the GL representation.

15. A method, comprising: receiving a specification for an image processing pipeline based on configuration settings associated with a user interface of a viewer application, wherein the specification is further based on a current state of the configuration settings or a data structure identifying at least one filter included in the image processing pipeline; generating a graphics language (GL) representation of the image processing pipeline based on the specification; and causing the GL representation to be compiled via a compile service to generate a binary executable instantiation of the image processing pipeline for execution on one or more graphics processing unit (GPU) cores.

16. The method of claim 15, wherein the GL representation comprises a source code including one or more GL functions with a corresponding executable mapping.

17. The method of claim 15, further comprising:
    receiving an image set that includes a first image of a photographic scene based on a first set of sampling parameters and a second image of the photographic scene based on a second set of sampling parameters; and
    processing at least one image in the image set via the binary executable instantiation of the image processing pipeline.

18. The method of claim 15, wherein the viewer application, in response to user input associated with the user interface, is configured to:
- modify the specification;
  - generate an updated GL representation of the image processing pipeline based on the modified specification; and
  - cause the updated GL representation to be compiled via the compile service to generate an updated binary executable instantiation of the image processing pipeline for execution on the one or more GPU cores.

19. A system, comprising: a host processor configured to: receive a specification for an image processing pipeline based on configuration settings associated with a user interface of a viewer application, wherein the specification is further based on a current state of the configuration settings or a data structure identifying at least one filter included in the image processing pipeline, generate a graphics language (GL) representation of the image processing pipeline based on the specification, and cause the GL representation to be compiled via a compile service to generate a binary executable instantiation of the image processing pipeline; and one or more graphics processing unit (GPU) cores coupled to the host processor and configured to execute the binary executable instantiation of the image processing pipeline.

20. The system of claim 19, further comprising:
- a memory storing an image set that includes a first image of a photographic scene based on a first set of sampling parameters and a second image of the photographic scene based on a second set of sampling parameters; and
- a display device configured to display a resulting image generated by processing at least one image in the image set via the binary executable instantiation of the image processing pipeline.

* * * * *